United States Patent [19]

Inakoshi

[11] Patent Number: 5,664,222

[45] Date of Patent: Sep. 2, 1997

[54] SYSTEM FOR AUTOMATICALLY DETERMINING PRINTER TYPE USING DURATION OF TIMING SIGNALS OF PRINTER HEAD TRAVELING BETWEEN FIRST AND SECOND REFERENCE POSITIONS

[75] Inventor: Tadashi Inakoshi, Suwa, Japan

[73] Assignee: Seiko Epson Corporation, Tokyo, Japan

[21] Appl. No.: 334,637

[22] Filed: Nov. 4, 1994

Related U.S. Application Data

[63] Continuation of Ser. No. 788,020, Nov. 9, 1991, abandoned.

[30] Foreign Application Priority Data

Nov. 8, 1990 [JP] Japan .................................. 2-303525
Sep. 27, 1991 [JP] Japan .................................. 3-249165

[51] Int. Cl.$^6$ ...................................................... H01J 3/00
[52] U.S. Cl. ........................... 395/836; 395/500; 400/705
[58] Field of Search ............................... 395/114, 275, 395/836, 830, 828, 835, 837, 838, 500; 400/705

[56] References Cited

U.S. PATENT DOCUMENTS

| | | | |
|---|---|---|---|
| 4,179,223 | 12/1979 | Kwan et al. | 400/320 |
| 4,448,553 | 5/1984 | Yonezawa et al. | 400/121 |
| 4,480,314 | 10/1984 | McKelley, Jr. et al. | 364/400 |
| 4,556,959 | 12/1985 | Allen et al. | 400/70 |
| 4,773,036 | 9/1988 | Belens et al. | 395/439 |
| 5,031,115 | 7/1991 | Hayashi | 364/519 |
| 5,101,496 | 3/1992 | Hayashi | 395/725 |
| 5,155,499 | 10/1992 | Goetz et al. | 346/1.1 |
| 5,182,650 | 1/1993 | Inoue | 358/296 |

FOREIGN PATENT DOCUMENTS 6048181 2/1987 Japan .

Primary Examiner—Thomas C. Lee
Assistant Examiner—Sang Hui Kim
Attorney, Agent, or Firm—Eric B. Janofsky

[57] ABSTRACT

An embodiment of the present invention comprises a system that causes a printer carriage to scan from a reference position to a second position. The status of the peripheral is monitored by the host computer with detectors that can sense the position of the carriage when at the reference position and the second position. A count is made of the number of clock pulses that occur during a time the carriage scans from scans reference position to the second position. A lookup table is then used that is indexed by the number of clock pulses. This provides a set of parameters the host computer will need to have available to use the peripheral right.

22 Claims, 4 Drawing Sheets

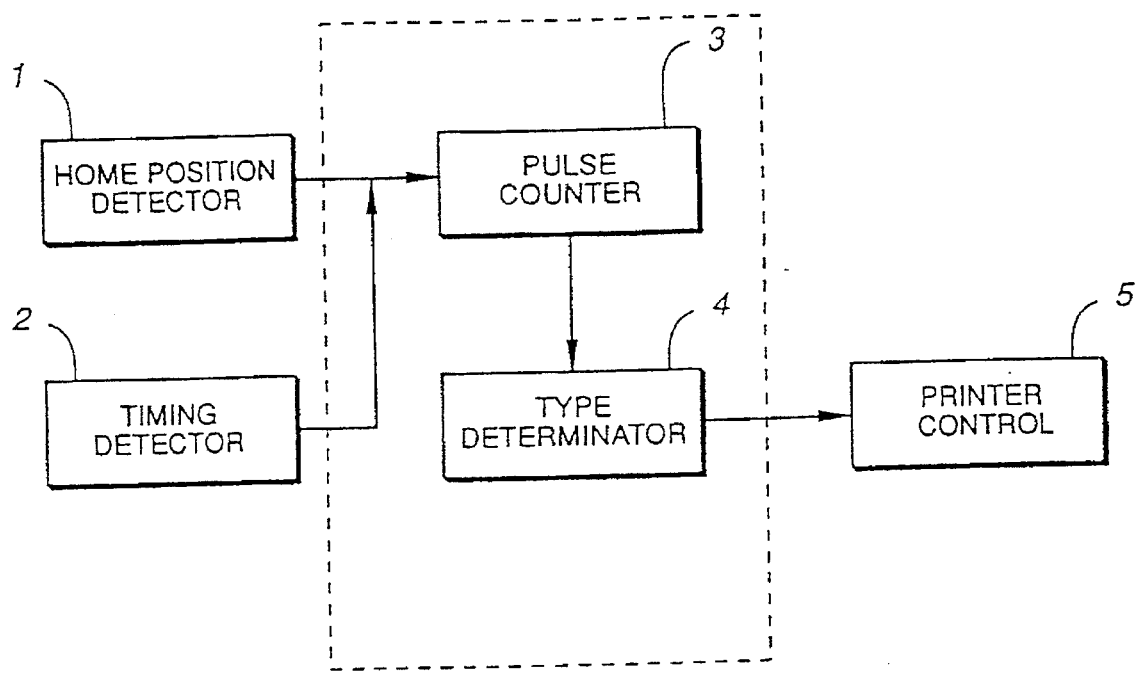
FIG._1
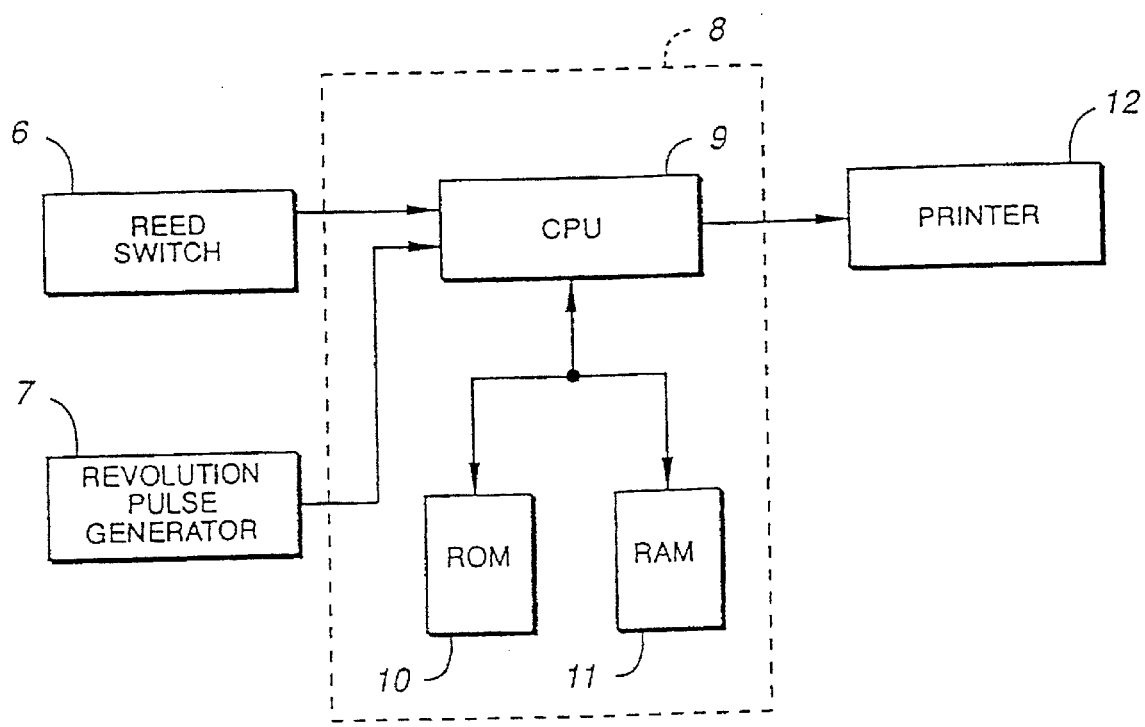
FIG._3

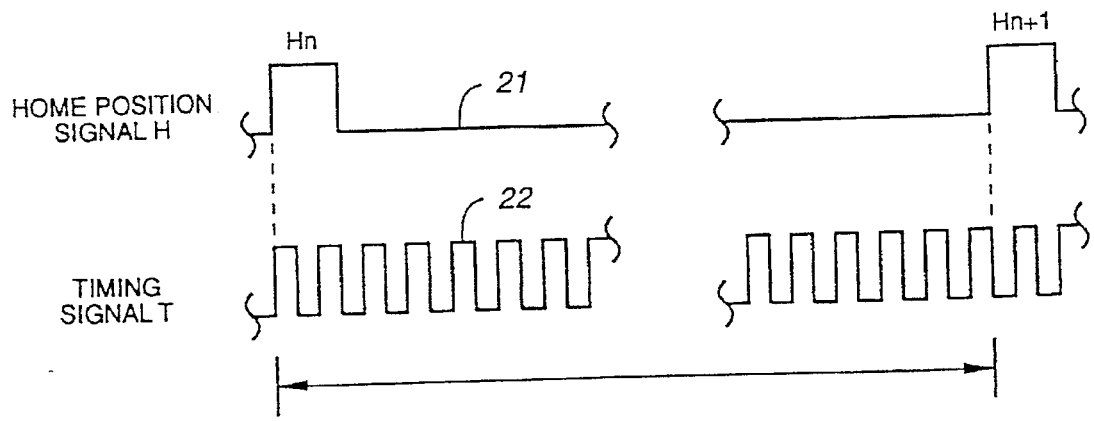
FIG._2
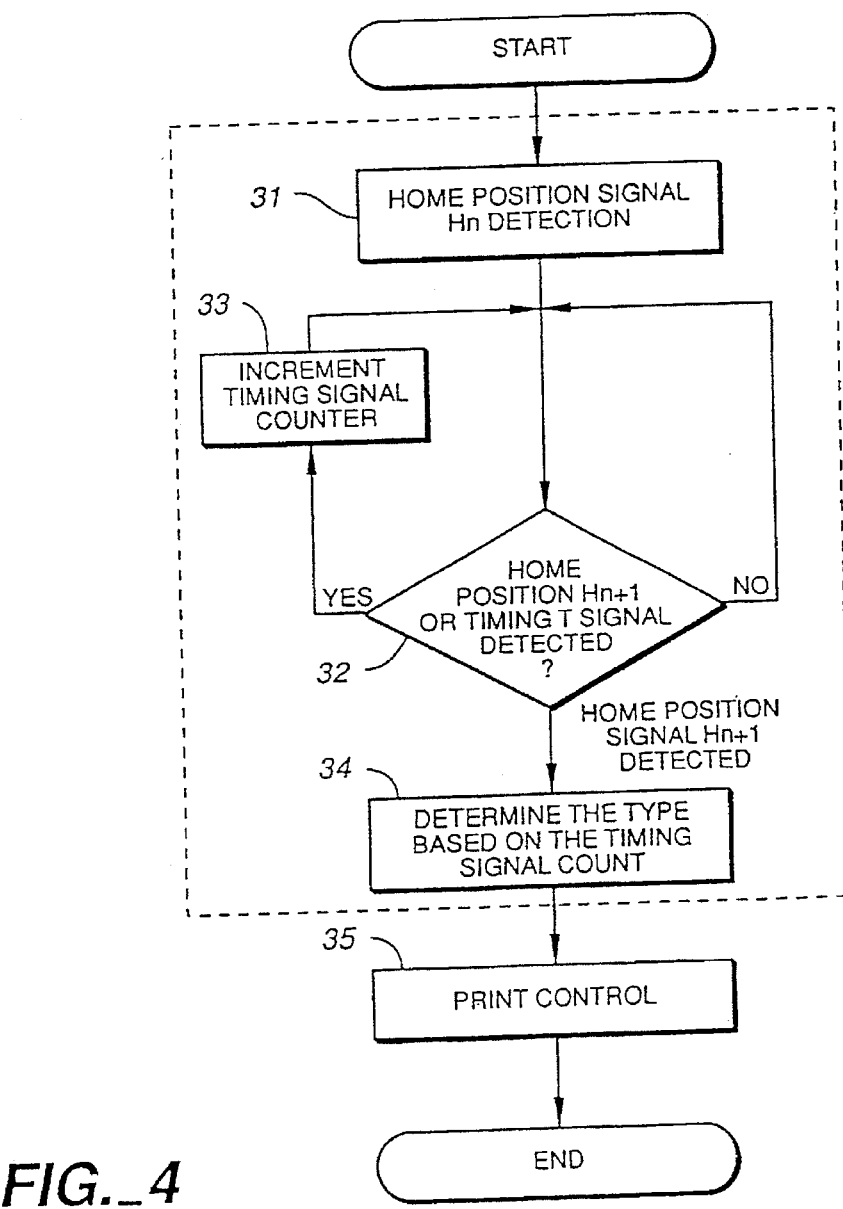
FIG._4

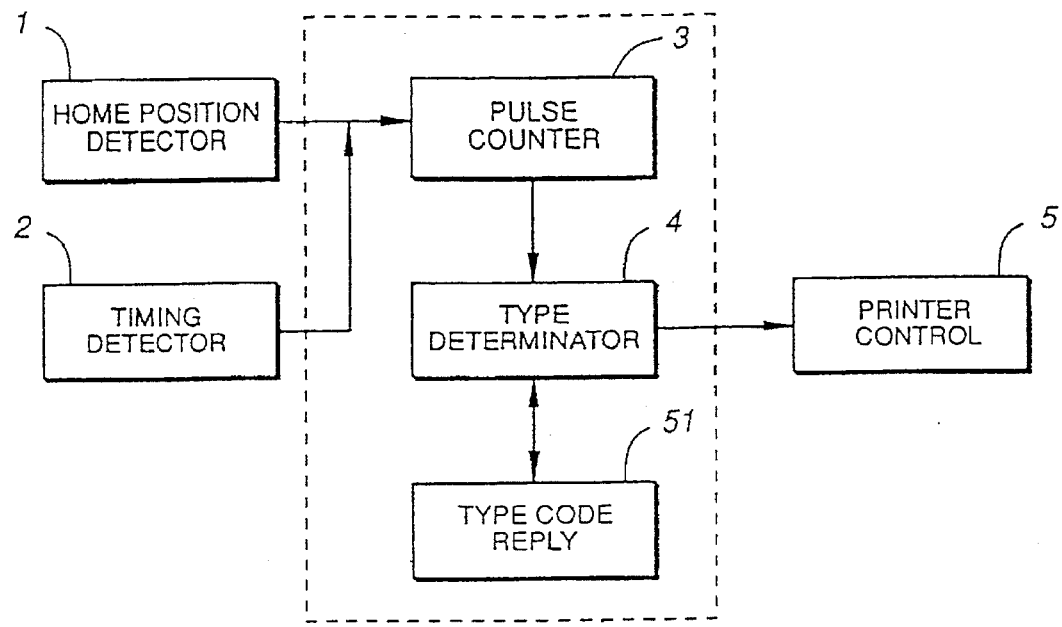
FIG._5
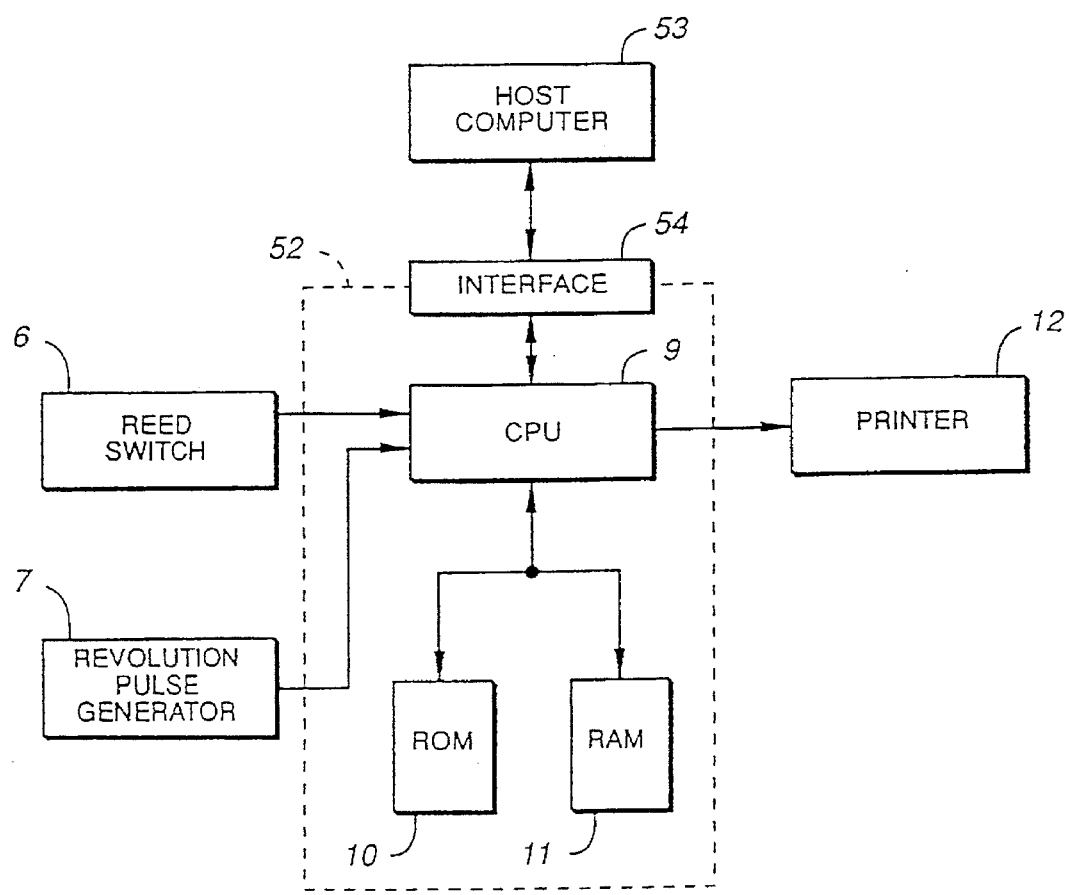
FIG._6

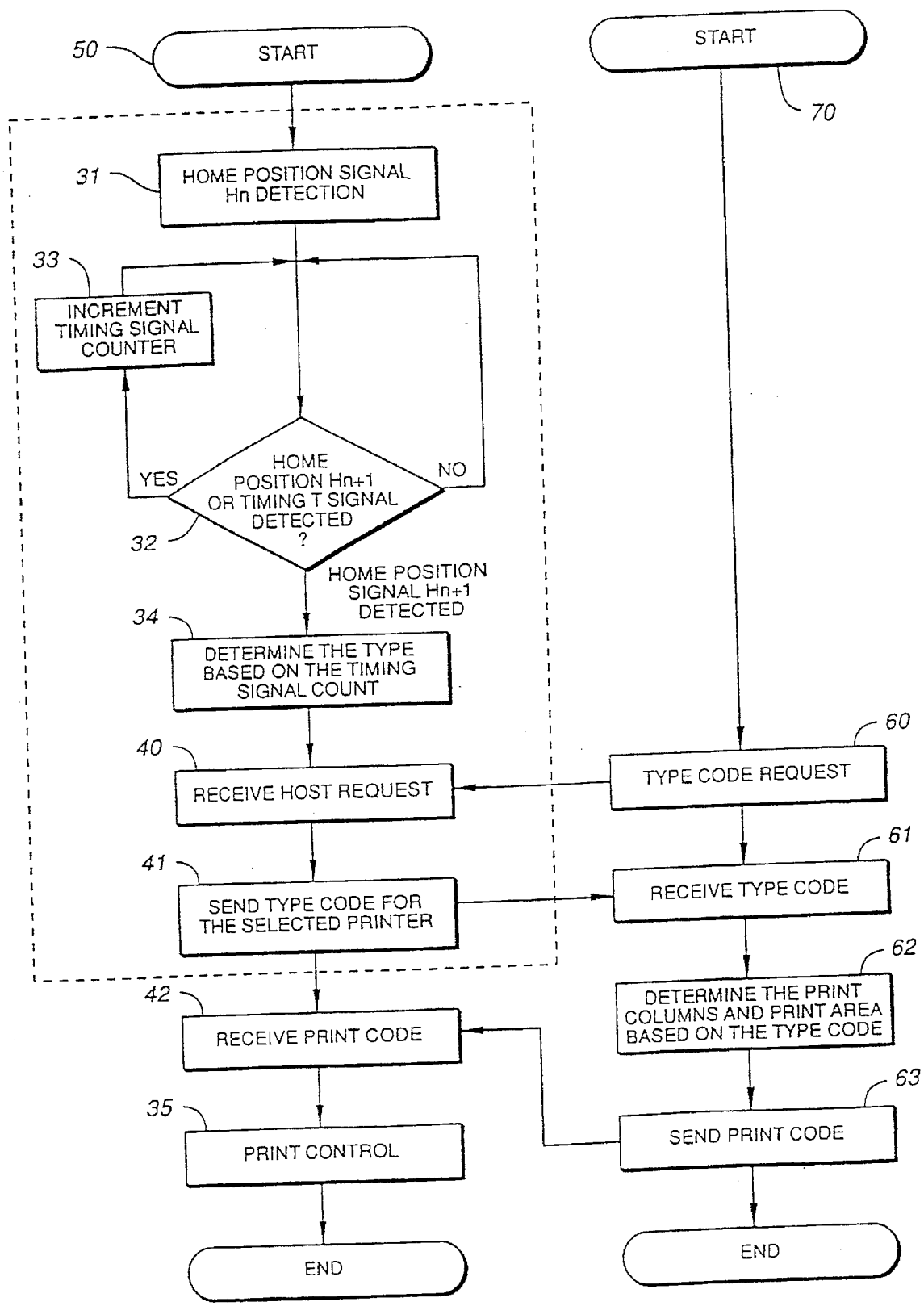
FIG._7

SYSTEM FOR AUTOMATICALLY DETERMINING PRINTER TYPE USING DURATION OF TIMING SIGNALS OF PRINTER HEAD TRAVELING BETWEEN FIRST AND SECOND REFERENCE POSITIONS

This is a continuaton of application Ser. No. 07/788,020 filed Nov. 5, 1991, now abandoned.

BACKGROUND OF THE INVENTION

The present invention relates generally to computers that can be interfaced with a range of printers and automatic methods for the host computer to discern the particular model of printer actually connected.

Standard interfaces have been very beneficial to most computer systems because they allow various computers and peripherals to be mixed and matched. Very often there are small, and sometimes large, differences between peripherals that a host computer has to know about. The common practice has developed to mount DIP switches on the circuit boards so that a technician can set the switches in a code pattern that the computer can read through a port to be informed about the configuration represented by the code.

The problem is such DIP switch solutions require board space, an I/O port, and someone with some technical skill and a code sheet to operate. An ordinary user often has a formidable challenge presented to him or her when changing peripherals requires also that the DIP switch patterns be changed.

In the case of printer peripherals, many kinds of specialized printers can be used by a common computing platform. These printers can have different paper feeds, line pitches, and column widths. What is needed is an automatic way for a computer system to determine on its own what model printer is connected to it. Such a solution would eliminate the board real estate, the I/O port(s), and the arcane codes needed for one or more DIP switches.

SUMMARY OF THE INVENTION

An embodiment of the present invention comprises a system that causes a printer carriage to scan from a home position to a second position. The status of the peripheral is monitored by the host computer with detectors that can sense the position of the carriage when at the home position and the second position. A count is made of the number of clock pulses that occur during a time the carriage scans from scans home position to the second position. A lookup table is then used that is indexed by the number of clock pulses. This provides a set of parameters the host computer will need to have available to use the peripheral right.

An advantage of the present invention is that it is possible to determine a printer peripheral's type based on the number of pulse counts a printer returns for a given operation. The count normally varies by type of printer mechanism, because a different number of printing columns and total number of dots in a print cycle will exist between otherwise identical units.

Another advantage of the present invention is that configuration DIP switches can be eliminated.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 1 is a functional block diagram of the present invention;

FIG. 2 is a timing chart of the home position signal and timing signal;

FIG. 3 is a circuit block diagram of the control unit which performs the printer selection process of the present invention;

FIG. 4 is a flow chart which indicates the printer type selection process of the present invention;

FIG. 5 is a block diagram of the control unit having the type code reply method in the printer type selection process of the present invention;

FIG. 6 is a circuit block diagram of the control unit which executes the process with a type code reply method of the present invention; and FIG. 7 is a flow chart which shows the process with a type code reply method of the present invention.

DETAILED DESCRIPTION OF THE EMBODIMENTS

An example of a printer embodiment of the present invention is shown in FIG. 1. It comprises a pulse counter 3 which tracks the number of pulses being output from a timing detector 2 after sensing a predefined reference position signal from a home position detector 1. The "home position" defines a starting point for print head movement. A printer type determination unit 4 compares the pulse count obtained to a list of possible printer types and outputs values useful for a printer controller 5. The type of printer shown in FIG. 1 has a simple carriage handling mechanism that may or may not always finish each printing operation by parking its carriage at a reference, or starting position. Any operation that involves movement of the carriage will cause the carriage to move off its reference position and into an active printing area. The carriage then does not return directly to the reference position, but is carried on to an extreme opposite the reference position before returning. This allows a simple belt and one-way motor to drive the carriage around the circuit path described. The length of this circuit and consequently the duration of time the carriage needs to travel the circuit can be unique for each model or type of printer in an otherwise identical family of printers. In some printers, two cycles of the carriage around the circuit will be needed to determine the type of the printer. A first cycle guarantees the carriage parks at the reference point, and the second cycle does the measurement of the duration of a full cycle circuit from reference point to reference point.

FIG. 2 shows the timing for an output signal H from home position detector 1 and an output signal from timing detector 2. A signal 21 goes high when a carriage is at the home position "Hn" or "Hn+1". A signal 22 is clock from the timing detector 2. Pulse counter 3 totalizes the number of pulses of signal 22 that occur between receipt of home position signals "Hn" and "Hn+1".

FIG. 3 is a control unit that can be used to determine the type of printer connected to a host computer based on the count in counter 3. A reed switch 6 is used for a home position detector. A pulse generator 7 that outputs a signal for each revolution of a carriage motor is a simple way to implement the timing detector. A microcomputer system 8 comprising a CPU 9, a ROM 10, and a RAM 11 can either be the host computer to which a printer peripheral is attached or an embedded controller within the peripheral itself. The rest of the printer is represented by a printer mechanism 12. A program is stored as firmware in ROM 10 for later execution by CPU 9 with temporary storage in RAM 11.

FIG. 4 represents a flowchart of a firmware program that can be stored in ROM 10. In step 31, microcomputer system 8 operates printer 12. Step 32 loops back and waits longer if a home position signal "Hn" and timing signal "T" are not detected. If a timing signal "T" is detected in step 32, control flows to step 33 to increment a counter equivalent to counter 3 and loops backs to step 32. When home position "Hn+1" is detected (actually a second occurrence of "Hn") in step 32, the count is complete and the type of printer connected to the host computer can be determined in step 34. A lookup table can be empirically derived for the count values that a range of different printer peripherals (e.g., printer 12) will produce when an operation is initiated in the above fashion. The lookup table then will supply the printer's parameters that are important for complete utilization of the printer in a system. For example, the number of columns a given printer model has can be stored and related to a count for an attached printer. In step 35, printing is then controllable according to the type of printer peripheral that has been identified as being actually attached. The above routine is preferably executed at boot-up of the host system, in order to eliminate delays during normal printing. The results of the routine are stored in RAM 11. If non-volatile writeable memory is available, it may be advantageous to store the results there, to save having to identify the printer peripheral every time the system is booted up.

Alternatively, printers that can be relied on to stop at a predefined position after completing each printing operation can have their type determined in a single scan of the carriage ending at the reference position. The functional block and circuit block diagram of such a setup would be identical to the discussion for FIGS. 1–6.

A pulse generator on a motor and reed switch were used for timing detection and home position detection. Other devices are possible and can give acceptable results. The present invention can be applied with success to configurations that use other kinds of detectors.

FIG. 5, which is similar to FIG. 1, shows that the type determination unit 4 is further comprised of a lookup table 51 that returns printer parameters in response to a type code derived from the count in pulse counter 3.

FIG. 6, which is similar to FIG. 3, has a microcomputer system 52 that includes the function of lookup table 51 and has an interface 54 that couples to a host computer 53. Lookup table 51 is located in host computer 53 and is available to CPU 9 by making a request and receiving an answer over interface 54.

In FIG. 7, process steps having the same numbers as in FIG. 4 are used to identify functional blocks that are similar. Step 50 begins a handling routine for embedded microcomputer system 52. A step 70 begins a handling routine for host computer 53. As can be seen, these two routines handshake with each other. After a printer type selection is completed in step 34, the printer type information is stored. CPU 9 will then wait in step 40 for a host request from host computer 53. Step 60 will supply such a request from the host. A step 41 then forwards a type code via interface 54 to be received by step 61. Step 62 determines the number of print columns and therefore the available print area, based on the type code. A step 63 sends back a print data code that comprises printer parameters needed for the particular type of printer attached to system 52 via interface 54 for receipt by step 42. Control of the printer is then adjusted accordingly in step 35.

While the invention has been described in conjunction with several specific embodiments, it is evident to those skilled in the art that many further alternatives, modifications and variations will be apparent in light of the forgoing description. Thus, the invention described herein is intended to embrace all such alternatives, modifications, applications and variations as may fall within the spirit and scope of the appended claims.

What is claimed is:

1. A printer, comprising:
   means for printing, said printing means including at least one print head;
   means for causing the print head to move between first and second reference points;
   means for detecting in a non-contacting manner whether the print head has traveled from the first reference point to the second reference point by providing a first timing signal upon detection that the print head is at the first reference point, and providing a second timing signal upon detection that the print head is at the second reference point;
   means, responsive to said detecting means, for measuring the duration of the movement of said print head between the first and second reference points in accordance with the first and second timing signals; and
   means for determining the model type of said printer on the measured duration.

2. The printer of claim 1, wherein said control means further includes means coupled to said determining means for storing a lookup table that includes a plurality of parameter sets wherein each parameter set corresponds to a distinct printer model type.

3. The printer of claim 1 wherein said means for causing of said control means includes means for positioning said print head at the first reference point.

4. The printer of claim 3 wherein the first reference point is a home position for said print head.

5. The printer of claim 1 wherein said printing means includes:
   a position detector that provides a first timing signal when said print head is at the first reference point and provides a second timing signal when said print head is at the second reference point;
   pulse generator that generates pulses; and
   wherein said measuring means includes a counter that is coupled to said position detector and said pulse generator and counts the number of pulses generated by said pulse generator within the time period defined by the first and second timing signals.

6. The printer of claim 5 wherein said determining means includes means for comparing the number of pulses generated within the time period with a list of predetermined values.

7. The printer of claim 6, further comprising means coupled to said determining means for storing a lookup table that includes the list of predetermined values corresponding to printer model types and associated sets of parameters.

8. The printer of claim 6 wherein said pulse generator outputs a pulse for each revolution of a carriage motor of said printing means.

9. The printer of claim 8 wherein the first reference point is a home position for the print head.

10. A system, comprising:
    a printer including:
       printing means including at least one print head and a carriage motor, a position detector that detects a position of the print head in a non-contacting manner, provides a first timing signal upon detecting that the print head is at a first reference point, and provides a second timing signal upon detecting that the print head is at a second reference point, and a pulse generator that outputs a pulse upon each revolution of the carriage motor;

control means for controlling the print head to move between the first and second reference points, said control means including a CPU and interface means coupled to said CPU, said CPU counting the number of pulses generated by said pulse generator within the time period defined by the first and second timing signals and comparing the number of pulses generated with a list of predetermined values to determine the model type of the printer; and a host computer coupled to said interface means and including means for storing a lookup table including the list of predetermined values corresponding to printer model types and associated sets of parameters, and means for processing print data in accordance with the parameters.

11. A method for determining a model type of a printer having at least one print head, comprising:

operating the printer to move the print head between first and second reference points;

detecting in a non-contacting manner whether the print head has traveled from the first reference point to the second reference point by providing a first timing signal upon detection that the print head is at a first reference point, and providing a second timing signal upon detection that print head is at a second reference point;

measuring the duration of the movement of the print head between the first and second reference points in accordance with first and second timing signals; and determining the model type of the printer based on the measured duration.

12. The method of claim 11, further comprising providing a set of parameters associated with the determined model type to control the printer.

13. The method of claim 12, further comprising storing a lookup table that includes a list of predetermined values corresponding to printer model types and associated sets of parameters.

14. The method of claim 12 wherein the step of operating includes positioning the print head at the first reference point.

15. The method of claim 14 wherein the first reference point is a home position for the print head.

16. The method of claim 11, further comprising:

providing a first timing signal when the print head is at the first reference point;

generating pulses;

providing a second timing signal when the print head is at the second reference point; and wherein the measuring step includes counting the number of pulses generated within the time period defined by the first and second timing signals.

17. The method of claim 16 wherein the step of determining includes comparing the number of pulses generated within the time period with a list of predetermined values.

18. The method of claim 17, further comprising storing a lookup table that includes the list of predetermined values corresponding to printer model types and associated parameter sets.

19. The method of claim 17 wherein said the step of operating includes positioning the print head at the first reference point.

20. The method of claim 19 wherein the first reference point is a home position for the print head.

21. The method of claim 16 wherein the step of generating includes outputting a pulse for each revolution of a carriage motor of the printer.

22. A method for determining a model type of a printer having at least one print head, comprising:

operating the printer to move the print head between first and second reference points;

detecting in a non-contacting manner whether the print head is at the first reference point;

providing a first timing signal upon detecting that the print head is at the first reference point;

generating pulses;

detecting in a non-contacting manner whether the print head is at the second reference point;

providing a second timing signal upon detecting that the print head is at the second reference point;

counting the number of pulses generated within the time period defined by the first and second timing signals;

comparing the number of pulses generated within the time period with a list of predetermined values to determine the model type of the printer;

storing the determined printer model type;

providing a type code representative of the determined printer model type to a host computer upon a host request from the host computer; and receiving a print code comprising printer parameters associated with the determined model type from the host computer for controlling the printer according to the print code.

* * * * *

UNITED STATES PATENT AND TRADEMARK OFFICE
CERTIFICATE OF CORRECTION

PATENT NO.    : 5,664,222
DATED         : September 02, 1997
INVENTOR(S)   : Tadashi Inakoshi It is certified that errors appear in the above identified patent and that said Letters Patent is hereby corrected as shown below:

Page 1, item 63, Related U.S. Application Data, Change "Nov. 9, 1991" to --Nov. 5, 1991--.

Signed and Sealed this

Twenty-seventh Day of January, 1998

Attest:

BRUCE LEHMAN

*Attesting Officer*   *Commissioner of Patents and Trademarks*